United States Patent [19]

Bygdnes

[11] Patent Number: 4,476,404

[45] Date of Patent: Oct. 9, 1984

[54] FLEXIBLE CONDUCTOR FOR SUPPLYING CURRENT TO A PIVOTALLY MOVABLE ELECTRICAL ELEMENT

[75] Inventor: Perry A. Bygdnes, Redwood City, Calif.

[73] Assignee: Tandon Corporation, Chatsworth, Calif.

[21] Appl. No.: 535,236

[22] Filed: Sep. 23, 1983

[51] Int. Cl.³ .................................. H02K 33/00
[52] U.S. Cl. ........................ 310/27; 310/36; 310/71; 339/28
[58] Field of Search .................. 310/36, 38, 71, 27; 339/8 R, 28

[56] References Cited

U.S. PATENT DOCUMENTS

| | | | |
|---|---|---|---|
| 3,521,092 | 7/1970 | Kalthoff | 310/27 X |
| 3,526,793 | 9/1970 | Fidi et al. | 310/36 |
| 3,671,829 | 6/1972 | Mathews | 310/27 X |
| 3,723,779 | 3/1973 | Gillum | 310/27 X |
| 3,783,302 | 1/1974 | Woodbridge | 310/36 X |
| 4,250,416 | 2/1981 | Watanabe et al. | 310/36 X |
| 4,255,853 | 3/1981 | Campillo et al. | 339/28 X |

*Primary Examiner*—Mark O. Budd
*Attorney, Agent, or Firm*—Fraser and Bogucki

[57] ABSTRACT

A flexible conductor strip is provided for connecting a pivotally mounted electrical element, such as the armature of a sector motor, to fixed terminals supplying control signals to the electrical element. The conductor strip includes an arcuate segment having end terminations for connection to the electrical element and to the control signal terminals. The arcuate segment is curved into a generally U-shaped configuration, thereby coinciding substantially with the surface of the frustum of an imaginary right circular cone whose axis extends substantially perpendicular to the pivot axis of the electrical element and whose vertex lies substantially on that pivot axis.

3 Claims, 7 Drawing Figures

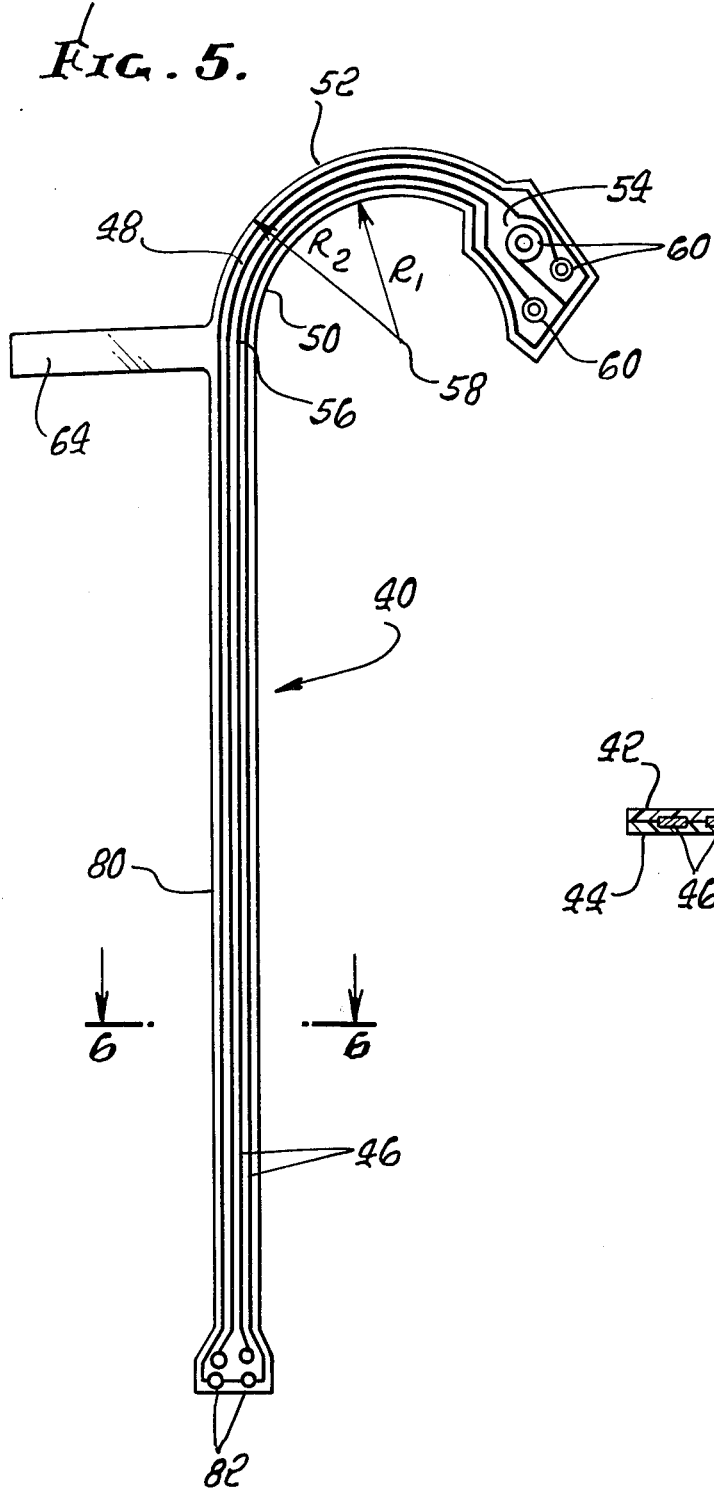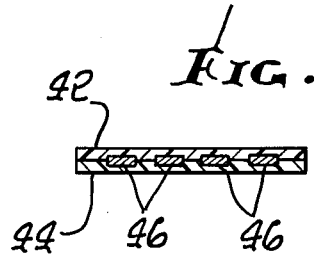

FLEXIBLE CONDUCTOR FOR SUPPLYING CURRENT TO A PIVOTALLY MOVABLE ELECTRICAL ELEMENT

FIELD OF THE INVENTION

The present invention relates generally to electrical conductors and particularly to flexible conductors for supplying current to a movable electrical element from a fixed point or terminal.

BACKGROUND OF THE INVENTION

It is often necessary to directly connect a movable electrical element, such as the armature coil of a permanent magent motor, to a fixed point such as the terminals of an electrical signal source. In most of these applications, the connecting conductors need only be designed and routed for long flex life and freedom from fouling. However, in some environments additional requirements and constraints are imposed. Certain magnetic disk memories, for example, employ recording head positioning mechanisms driven by a motor including an armature forming an integral part of the movable portion of the positioning mechanism. Because such mechanisms must be capable of extremely rapid acceleration and deceleration to move the recording heads as quickly as possible along the disk surfaces to minimize the time for accessing selected data tracks, the armature leads—besides having to have a long flex life and freedom from fouling —must not impose any significant inertia, friction or other resistance or drag opposing the motion of the positioning mechanism.

One approach to this problem is disclosed in U.S. Pat. No. 3,544,980 issued Dec. 1, 1970 to R. A. Applequist et al. There, the bobbin or armature of a permanent magnet motor is attached directly to the carriage of a linearly displaceable head positioning mechanism. Current is supplied to the armature coil through a pair of conductor strips having a transverse curvature (much like a carpenter's tape measure) and connected at one end to a pair of fixed power supply terminals on the motor frame and at the other end to terminals on the movable armature. The use of such strips is not practical, however, in disk memories in which head positioning mechanism (and hence the armature carried thereby) moves in an arc about a pivot axis rather than linearly. A cyclical twisting of the conducting strips would result, reducing the life thereof and introducing a significant level of resistance to the displacement of the positioning mechanism.

SUMMARY OF THE INVENTION

Broadly, the present invention provides a low inertia, flexible conductor for connecting a pivotally mounted electrical element, such as the armature of a head positioning mechanism sector motor, to a source of electrical control signals without introducing any appreciable friction or other resistance or drag opposing the motion of the pivoted element.

In accordance with a preferred, specific embodiment of the invention, the conductor is in th form of a thin, laminated, strip consisting of outer insulative films sandwiching an inner conductive layer. In its developed configuration, that is, laid out flat, the conductor strip comprises an arcuate segment having a first end portion including electrical termination pads for connection to the movable elementrical element and a second end portion incorporating electrical terminations for connection to the control signal source. A tab is provided adjacent the second end portion for attaching that portion to a fixed structure such as the motor frame. In its installed form, the arcuate segment of the conductor strip is curved into a generally U-shaped configuration. The geometry is such that the U-shaped, arcuate segment coincides substantially with the surface of the frustum of an imaginary right circular cone whose axis intersects and is substantially perpendicular to the pivot axis of the movable electrical element and whose vertex lies substantially on that pivot axis. During the pivotal, oscillatory movement of the electrical element, virtually no stress is introduced as there is no twisting of the conductor. Accordingly, the conductor does not impede rapid oscillatory motions of the electrical element and provides a highly reliable, long life electrical connection.

BRIEF DESCRIPTION OF THE DRAWINGS

Further objects, advantages and features of the invention will become evident from the ensuing detailed description taken in conjunction with the accompanying drawings in which:

FIG. 5 is a plan view of the flexible conductor strip in its developed form, that is, laid out flat; and FIG. 6 is a cross-section view of the strip shown in FIG. 5 as seen along the plane 6—6.

DETAILED DESCRIPTION OF THE PREFERRED EMBODIMENT

Figure 1:
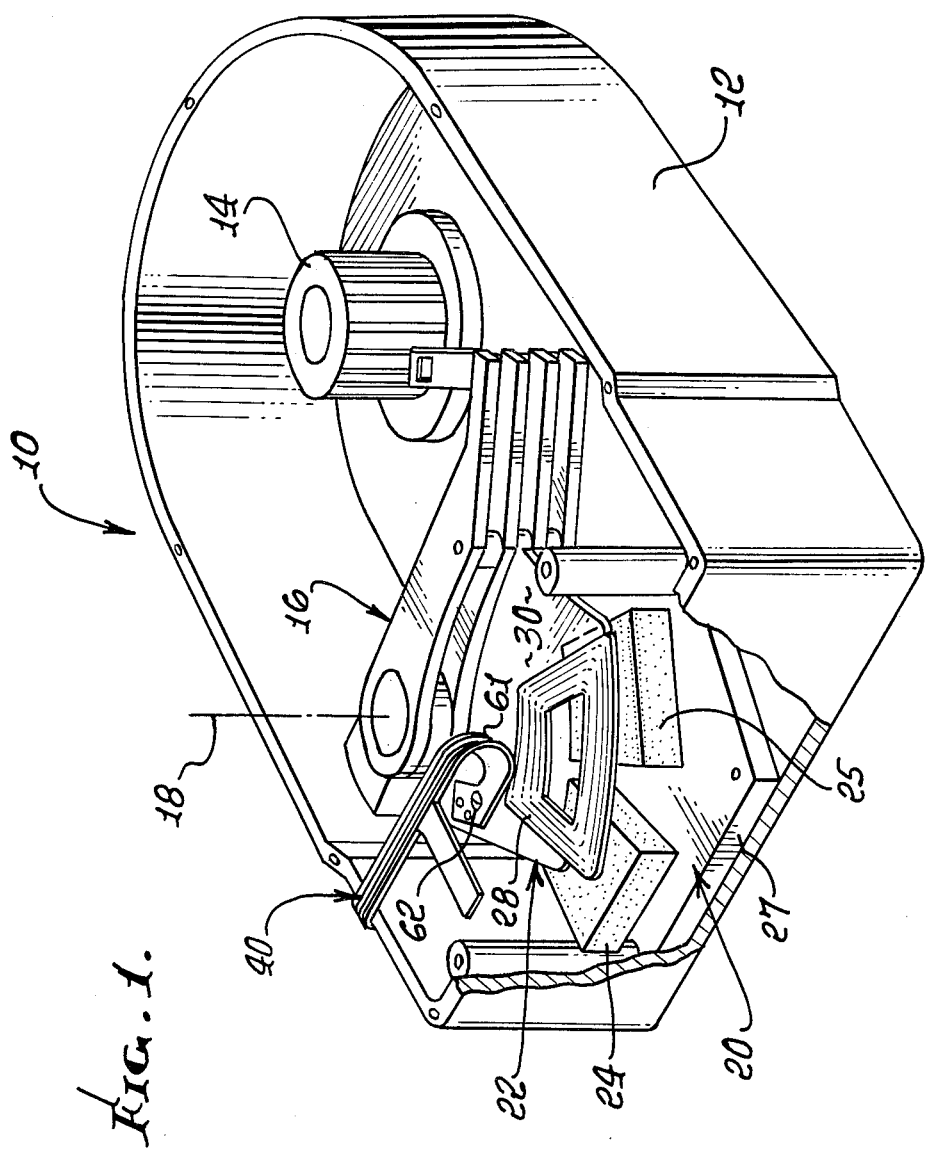
FIG. 1 is a perspective view of portions of a magnetic disk memory including a head positioning mechanism incorporating a specific embodiment of the present invention.
Figure 2:
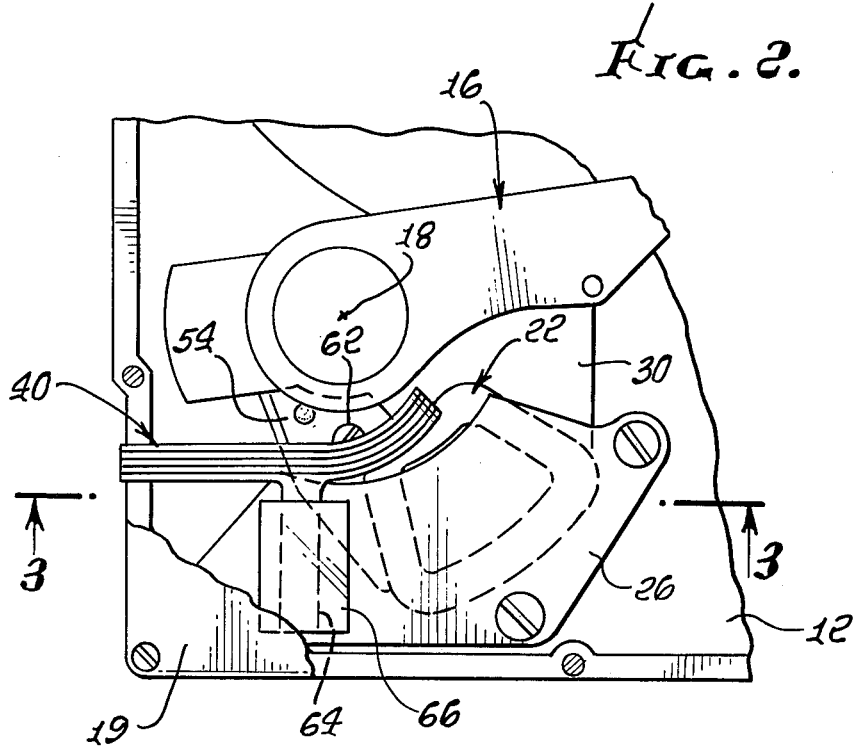
FIG. 2 is a plan view of a portion of the disk memory of FIG. 1.
Figure 3:
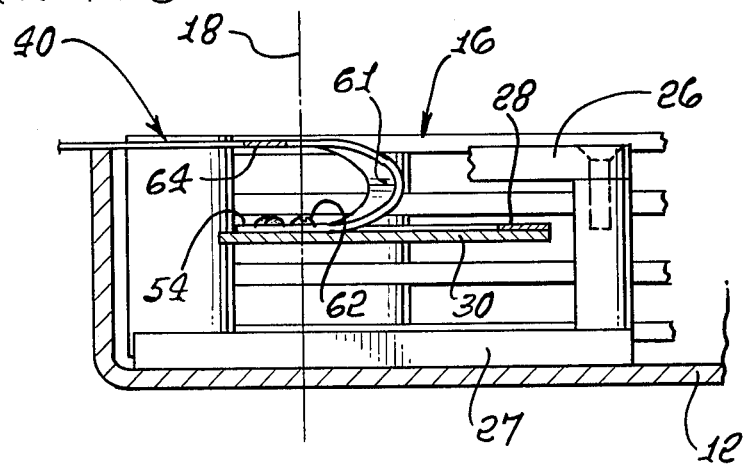
FIG. 3 is a transverse cross-section view of the disk memory shown in FIG. 2, as seen along the plane 3—3.

With reference to FIGS. 1, 2 and 3, there is shown somewhat schematically portions of a magnetic disk memory 10 of the "Winchester" type. The memory comprises, generally, a cast housing 12 enclosing a motor-driven spindle 14 for supporting one or more magnetic disks (not shown) and an associated head/arm assembly 16 mounted to pivot about a vertical axis 18. The housing is sealed by a cover plate 19 part of which is shown in FIG. 2. The assembly 16 is translated relative to the disk surfaces by a head positioning mechanism including a moving coil sector motor 20 which, in response to electrical address signals, displaces the assembly 16 so as to access addressed tracks on the disk. As is well known in the pertinent art, it is important to minimize track access time. To achieve the rapid bidirectional accelerations and decelerations thus required, not only must low inertia components by employed but friction and other sources of drag or resistance opposing the motion of the positioning motor and head/arm assembly must be reduced to a minimum. In this connection, the positioning motor 20 has a high torque-to-inertia ratio, employing a lightweight armature 22 disposed between upper and lower pairs of high field strength permanent magnets 24 and 25 bonded, respectively, to upper and lower frame members 26 and 27. (In FIG. 1, the upper magnets 24, 25 and frame member 26 have been omitted for clarity). The armature 22 consists of a coil 28 mounted on a thin aluminum plate 30 secured to the head/arm assembly 16; accordingly, the armature 22 and head/arm assembly 16 pivot about the axis 18 as a single unit.

Electrical signals for energizing the positioning motor 20 are transmitted to the armature coil 28 via a thin, flexible conductor strip 40. FIGS. 1, 2, 2a, 3 and 4 depict the strip 40 in its installed configuration while FIG. 5 is a development of the strip showing it laid out flat, that is, as it appears after fabrication but before being installed. In accordance with the specific, exemplary embodiment under consideration, and with reference now also to FIG. 6, the strip 40 is a laminated structure consisting of outer polyimide layers 42 and 44 sandwiching a copper layer etched to form individual conductors 46.

As best seen in FIG. 5, the strip includes an arcuate segment 48 having an inner edge 50, an outer edge 52 and end portions 54 and 56. The inner and outer edges 50 and 52 comprise arcs of concentric circles of radii $R_1$ and $R_2$, respectively, having their center at the point 58. The end portion 54 is enlarged and incorporates a series of conductor termination pads 60.

Figure 4:
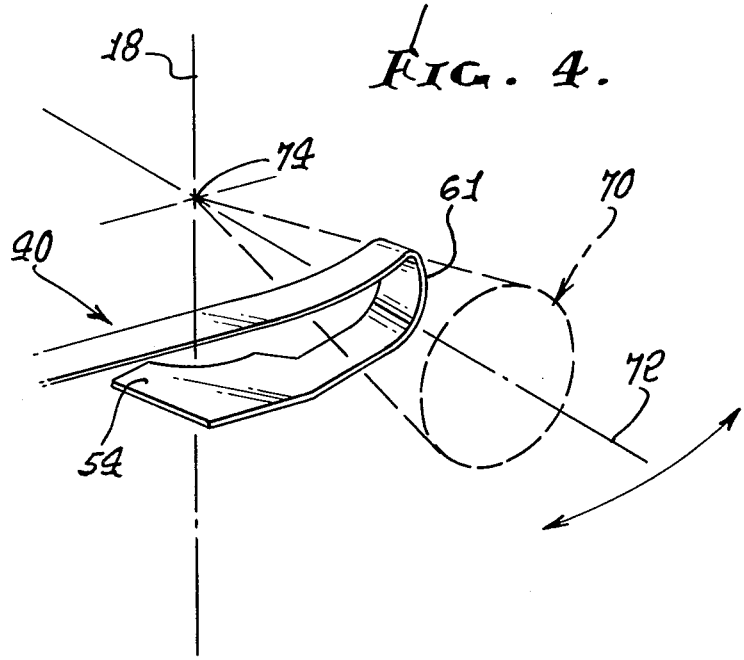
FIG. 4 is a perspective view of a portion of the flexible conductor strip shown in the preceding Figures to more clearly illustrate the geometry thereof.

The strip 40 is installed by curving the arcuate segment 48 into a generally U-shaped configuration indicated by the reference numeral 61 in FIGS. 1, 3 and 4. The end portion 54 is secured to the armature plate 30 with a screw 62 (FIGS. 1, 2 and 3) and the termination pads 60 are connected to the armature coil 28 via appropriate conductive paths (not shown).

Figure 2A:
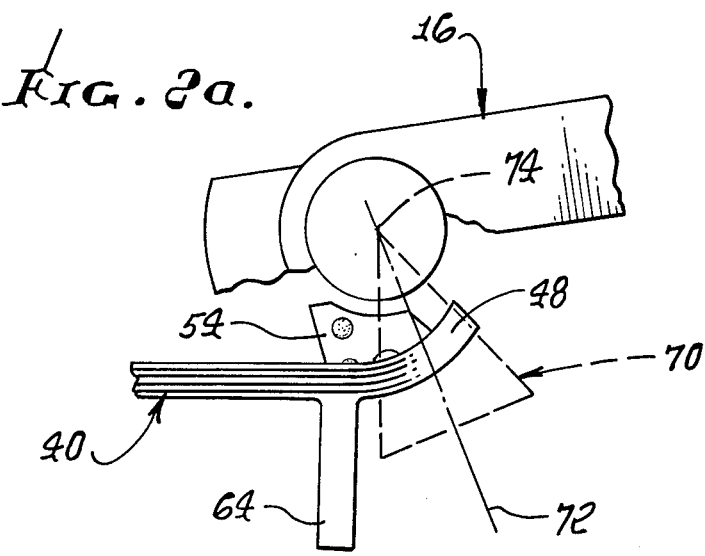
FIG. 2a is a plan view similar to FIG. 2, with certain parts omitted to show the geometry of the flexible, conductive strip of the invention.

Adjacent the end portion 56 is a tab 64 for securing the end portion 56 to a fixed surface such as the upper motor frame member 26, as shown in FIG. 2. The tab 64 may be conveniently attached by means of pressure sensitive adhesive or a length of transparent tape 66. It will thus be seen that while the end portion 54 of the conductor strip moves with the armature plate along a circular path about the pivot axis 18, the end portion 56 is constrained by the tab 64. Given the geometry of the strip 40 and the components associated therewith, all as described herein, the U-shaped part 61 of the strip 40 coincides substantially with the surface of the frustum of an imaginary right circular cone 70 whose axis 72 intersects and extends substantially perpendicular to the axis of rotation 18 of the armature and whose vertex 74 lies substantially on that axis of rotation. (FIGS. 2a and 4). During the oscillatory motion of the armature about the pivot axis 18, the axis 72 of the imaginary cone 70 is correspondingly translated angularly about the axis 18. The action is virtually stress free because there is no twisting of the conductor.

The facilitate connection of the conductor strip 40 to a source of positioning motor control signals, the end portion 56 may include an extension 80 imparting to the strip a generally J-shaped configuration when laid out flat, as best shown in FIG. 5. The extension 80 includes conductor termination pads 82 adapted for connection to the control signal circuitry by means well known in the art.

What is claimed is:

1. A sector motor for use in connection with a recording head positioning mechanism, or the like, including:
    a frame;
    an armature mounted on the frame for pivotal, oscillatory movement relative thereto about an axis of rotation; and
    a flexible conductor strip for coupling the armature to a source of electrical control signals, the conductor strip having a first end portion including terminations connected to the armature and a second end portion including (i) terminations adapted to be connected to the electrical signal source and (ii) means for attaching the second end portion to the frame, the portion of the conductor strip intermediate the end portions being generally U-shaped and coinciding substantially with the surface of the frustum of an imaginary right circular cone whose axis intersects and extends substantially perpendicular to the axis of rotation of the armature and whose vertex lies substantially on that axis.

2. A sector motor, as defined in claim 2, in which:
    the second end portion of the conductor strip includes a generally linear extension.

3. A sector motor, as defined in claim 2, in which:
    the attaching means comprises a tab projecting from adjacent said second end portion.

* * * * *